Inventors:
Ralph M. Manning
Francis W. Truesdell
by, Richard E. Hosley
Their Attorney

Fig. 2

Jan. 21, 1958  R. M. MANNING ET AL  2,820,861
CIRCUIT CONTROLLER
Filed March 31, 1955  7 Sheets-Sheet 3

Inventors:
Ralph M. Manning
Francis W. Truesdell
by, *Richard E. Hosley*
Their Attorney Jan. 21, 1958

R. M. MANNING ET AL 2,820,861

CIRCUIT CONTROLLER

Filed March 31, 1955

Inventors:
Ralph M. Manning
Francis W. Truesdell
by, Richard E. Hosley
Their Attorney Jan. 21, 1958

R. M. MANNING ET AL 2,820,861

CIRCUIT CONTROLLER

Filed March 31, 1955

Inventors:
Ralph M. Manning
Francis W. Truesdell
by, Richard E. Hosley
Their Attorney Jan. 21, 1958

R. M. MANNING ET AL 2,820,861

CIRCUIT CONTROLLER

Filed March 31, 1955

Inventors:
Ralph M. Manning
Francis W. Truesdell
by: Richard E. Hosley
Their Attorney Jan. 21, 1958 R. M. MANNING ET AL 2,820,861
CIRCUIT CONTROLLER Filed March 31, 1955

Inventors:
Ralph M. Manning
Francis W. Truesdell
by, Richard E. Hosley
Their Attorney United States Patent Office 2,820,861
Patented Jan. 21, 1958

2,820,861

CIRCUIT CONTROLLER

Ralph M. Manning, West Medford, Mass., and Francis W. Truesdell, Dover, N. H., assignors to General Electric Company, a corporation of New York Application March 31, 1955, Serial No. 498,188

23 Claims. (Cl. 200—39)

This invention pertains to a circuit controller and particularly to a circuit controller of the timer switch type which performs a switching operation at predetermined times in a time cycle.

Circuit controllers of the timer switch type find extensive application in processes associated with the manufacture of goods and the fabrication of materials. In such applications it is often required that a device be operated at a predetermined time for a discreet period of time and that the operation of the device be repeated any number of times successively. To fulfill these requirements, circuit controllers are designed to operate according to a time cycle wherein a switch is operated at successive times during the time cycle whereby switching operations occur to effect an external electric circuit. To give the circuit controller greater adaptability in its industrial applications, it is usually designed so that the times at which switching occur are adjustable over a wide range.

In the design of such circuit controllers the omnipresent goals of compactness, simplicity of operation, ease of assembly and reduction of the number of parts are always sought. At the same time it is also desirable that the circuit controller perform efficiently in both the electrical and mechanical sense. It is generally recognized that the rotary timing mechanism is best suited for compactness in structure and simplicity in operation while it is also generally recognized that the switch elements of the circuit controller which operate with a snap action are best capable of assuring accuracy in the timing interval.

In the past, circuit controllers have used rotary timing mechanisms and rotary switches. Snap action, however, was achieved only at the expense of complicated latch and trip or cam and cam-follower mechanisms. Alternate structure provided for rotary timing mechanism with snap-acting switches having a pair of switching elements each of which was capable of snap movement which operated in a translatory manner in relation to the axis of rotation of the timing mechanism. Here again cam and cam-follower means or latch and trip mechanisms which were provided were complicated and involved a multiplicity of parts. The disadvantages of these designs were further emphasized when it was desired to adjust the times for switch operation. Usually such time settings were made by manually rotating the elements which were also being driven by the rotary timing mechanism. Adjustability depended then upon the interruption of the operation of the circuit controller where it might otherwise be unnecessary or undesirable or in the provision of frictional couplings, to avoid injury to the moving parts.

Insofar as repetition of the cycle of operations was concerned prior circuit controller designs which incorporated rotary timing mechanisms and non-rotary snap switches when each switch element was capable of independent snap movement depended upon the rotating cams to return the switch elements to their reset position subsequent to switch operation. Since the cams were rotated by the timing mechanism this method of resetting the switching elements was time consuming and necessarily limited the potential adjustability of the timing interval to substantially less than the entire timing cycle. Additionally, the problem of resetting included the necessity of maintaining the switching elements in a fixed relative position during resetting. Upon resetting by continuing rotation of the switching cams, the problem became additionally acute since each of the switch elements was independently resettable.

It is therefore an object of the present invention to provide a circuit controller which is capable of performing a switching operation at predetermined times in a time cycle and capable of having the times of the operation of the switching adjustably varied over a wide range limited only by the length of the time cycle and capable of rapid reset of the switching elements without change in their relative position at the termination of the cycle whereupon repetition of the cycle may occur in a relatively short time. It is a further object of the present invention to provide a circuit controller capable of performing a switching operation at predetermined times during a time cycle having improved means for adjustably varying the times at which switching occurs without interrupting the circuit controller in its operation. It is also an object of the present invention to provide improved components in a circuit controller which are associated with the operation of the switching elements and in the initiation and termination of the timing cycle.

In a preferred embodiment, this invention takes the form of a circuit controller operative according to a time cycle, having a pair of contact carrying elements having a bias position, a pair of coaxial movable control members adapted to engage the contact carrying elements, and a movable support member on which the control members may move independently relative to each other and with which the control members are movable conjointly without change in their relative position whereby the switching positions of the contact carrying elements may be changed at predetermined times during the cycle and resetting is made possible to repeat the cycle. Latch means are associated with each control member and are adapted to hold the control members and hence the contact carrying elements in a predetermined position against their bias. Manual adjusting means are provided for independently adjusting the latch means to relative angular positions whereby the times at which switching takes place may be varied. Rotating cams operate as trip means to release latches at their preselected settings. A single shaft is provided to support the entire control member assembly, the latch means, and the tripping means while additionally serving as a means for rotatingly adjusting one of the latching means.

The initiation and termination of the time cycle depend upon the operation of a solenoid which functions to control engagement of a driving member to a driven member by operating a gear reduction unit which is mounted pivotally for swinging movement at one end. The solenoid additionally controls the operation of resetting the control members and hence the main contact carrying elements upon termination of the time cycle. Both the clutching function and the resetting function are performed through the agency of a single mechanical element specially constructed for the purpose.

The initiation and termination of the time cycle ultimately depend upon the energization and de-energization of the solenoid. A reciprocating actuator plate is adapted to operate an initator contact switch and a limit contact switch at the limits of its reciprocation to control the energization of the solenoid. A driven member is adapted with means to impart force to the reciprocating actuator plate near and at limits of rotative movement whereby reciprocation takes place, while additionally, the driven member serves to operate the latch trip means in accordance with torque supplied to it from the driving member through the gear reduction unit. A windup element is provided on the driven member capable of receiving energy from the rotation of the driven member during the time cycle, and adapted to release the energy upon termination of the time cycle whereby the driven member and hence the latch trip means are returned to an initial rotative position, and as a result of which the driven member imparts force to the reciprocating actuator plate to move it to its first limiting position to actuate the cycle initator contact switch. The construction and the mounting of the reciprocating actuator is such that while it serves to operate cycle initiating and limit contact switches it also cooperates with a switch mounting plate to serve as a positive stop mechanism to the driven member as it returns to its initial rotative position. To reduce possible rebound of the reciprocating actuator and driven member when the positive stop function of the reciprocating actuator plate is performed, slip friction components are provided as part of the gear reduction unit assembly. Special cam and notch features are provided on the reciprocating actuator plate to produce snap action operation of the limit switch. Latch means is specially designed for pivotal mounting on the control members with provision for making the latching function a positive one regardless of the angular position which the latch means may assume upon adjustment.

The features of this invention which are believed to be novel are set forth in the appended claims while further important aspects and features as well as objects and advantages will be more readily understood by a reference to the following detailed description and drawings of which:

Figure 1:
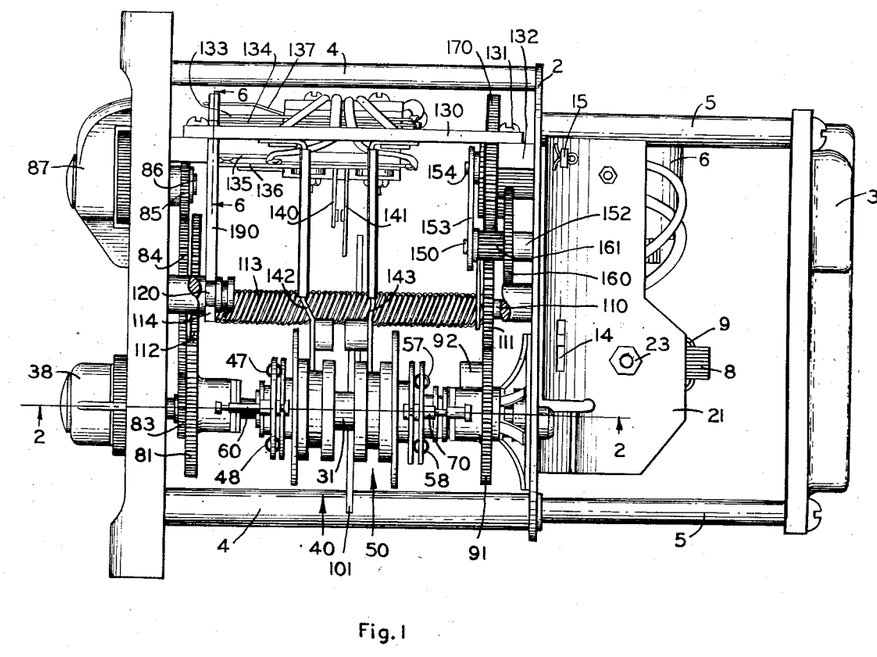
Fig. 1 is a top view of a complete circuit controller embodying the aspects of this invention.
Figure 2:
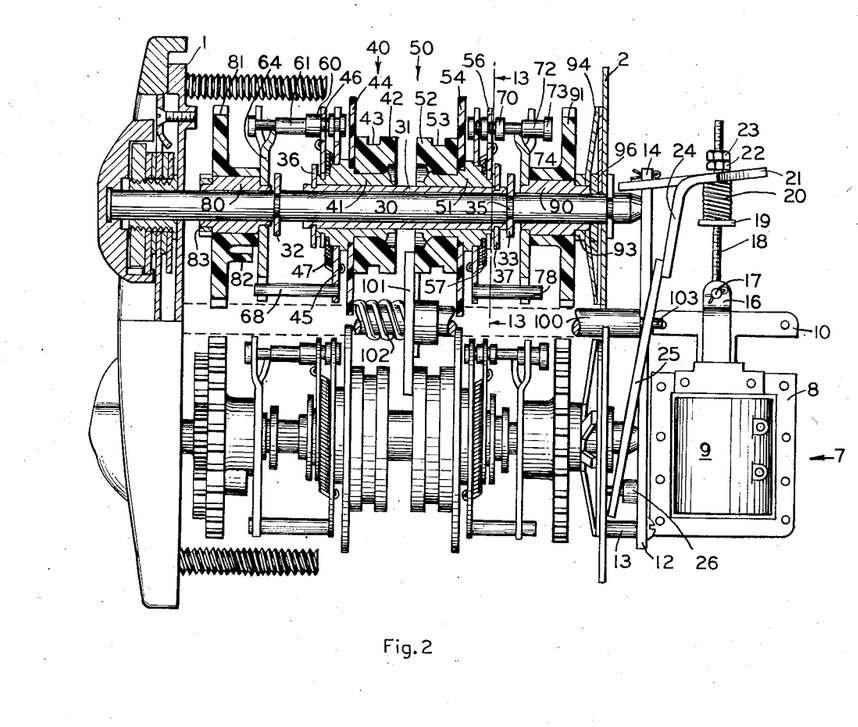
Fig. 2 is a side view showing in cross-section along line 2 in Fig. 1 the arrangement of parts relating to the control members, latching means, and related parts. The circuit controller described in this figure incorporates the invention as it may be used where it is desired to have a pair of circuit controlling switches.

The circuit controller in a preferred embodiment comprises an unitary structure as best shown in Figs. 1 and 2 having front and rear mounting plates 1 and 2 spaced apart by suitable spacing posts 4 and a terminal strip 3 of any suitable type mounted to the rear of the rear mounting plate by a number of appropriate spacing posts such as at 5. A driving member which may be a constant speed electric motor 6 is mounted between the terminal strip and the rear mounting plate in a manner permitting the free end of the motor shaft to extend through an opening in the rear mounting plate. Appropriate bearing means may be provided in the opening of the rear mounting plate to receive the motor shaft. A pinion gear 176 is affixed to the free end of the motor shaft.

The circuit controller operates in a cyclic manner and is also reconditionable for repetitive operation, either automatic or manual. The initiation of the timing cycle depends upon a clutching operation while repetition depends upon a resetting operation. The resetting and clutching operations are controlled by a solenoid 7 which may be of the conventional type comprising core 8, coil 9, and movable armature 10, and which is mounted between the rear mounting plate and the terminal strip proximate the electric motor on a hinge plate 12 in any suitable manner. The hinge plate is spaced from the rear mounting plate by a number of spacing posts such as at 13. The provision of sufficient spacing between the rear mounting plate and terminal strip permits space for connecting appropriate lead wires (not shown) from the electric motor, solenoid, and switch components of the controller to the terminal strip in desired fashion.

In the interest of compactness and ease of assembly, the switch components of the circuit controller are mounted on a single switch mounting plate 130 which is mounted on one side of the circuit controller unit perpendicular to and between the front and rear mounting plates in any well known manner. As shown in Fig. 1, screws 131 hold switch mounting plate 130 attached to mounting blocks 132 which are in turn secured to the front and rear mounting plates in any suitable manner. An initiator contact switch comprising leaf spring contact blades 133 and 134 is mounted on one side of the switch mounting plate while a limit switch comprising contact blades 135 and 136, and a holding switch comprising leaf spring contact blades 140 and 141 are mounted on the opposite side of the switch mounting plate. On the same side of the mounting plate as the limit and holding switches is the main switch which functions to control any external electric circuit. This main switch comprising contact carrying elements 142 and 143 of the leaf spring type is mounted so as to extend substantially transverse to the mounting plate approximately central to and parallel to the rear and front mounting plates. The free extending ends of the main switch are adapted to be engaged by control members 40 and 50.

The operation of the main contact switch for circuit control is obtained through the control members which are part of an unitary assembly mounted upon a single shaft 30 which in turn is mounted between and perpendicular to the front and rear mounting plates substantially parallel to the switch mounting plate. One end of shaft 30 extends through an opening in the rear mounting plate and is grooved near the protruding end to receive a retaining ring 33 of any well known type to lock the shaft against translatory movement. The other end of shaft 30 extends through an opening in the front mounting plate. An appropriate knob 38 and retaining means to aid in rotatably adjusting the shaft are provided. Knob 38 may be provided with lock means of any suitable type to hold knob in fixed position following setting of the time interval.

Included in the unitary assembly on shaft 30 are the latch means and the latch trip means. The latch means are in part associated with the control members 40 and 50 for movement therewith and in part associated with members fixed to said shaft on either side of the control members. The latch trip means take the form of cam bearing gears 81 and 91 mounted near opposite ends of shaft 30 for free rotation thereon.

Located proximate to the shaft 30 on the side of the circuit controller opposite the switch mounting plate 130 is reset rod 100 mounted between the front and rear mounting plates and adapted to be movable with respect thereto. A reset plate 101 is adapted to be fixedly mounted on said reset rod 100 so as to extend generally toward and between the control members and toward the switch mounting plate so as to be capable of engagement with holding switch contacts 140 and 141. Appropriate insulation (not shown) is provided to permit contacts 140 and 141 to be engaged by reset plate 101. Reset plate 101 also extends in a direction opposite the switch mounting plate 130 where it is adapted to straddle a spacing post 4 to prevent rotation of reset rod 101. Mounted in compressed state on reset rod 100 between reset plate 101 and the front mounting plate is reset spring 102.

Mounted between the front and rear mounting plates centrally with respect to the switch mounting plate 130, the control member assembly shaft 30, and the electric motor 6 is a driven member comprising shaft 110 and a pair of gears 111 and 112 mounted on said shaft at opposite ends proximate the front and rear mounting plates. A windup spring 113 is mounted on shaft 110 between gears 111 and 112 with one end anchored to the shaft and the other end anchored to a suitable non-rotatable member. As mounted, the gears 111 and 112 are adapted to be in permanent engagement with the cam bearing gears 81 and 91.

Figure 10:
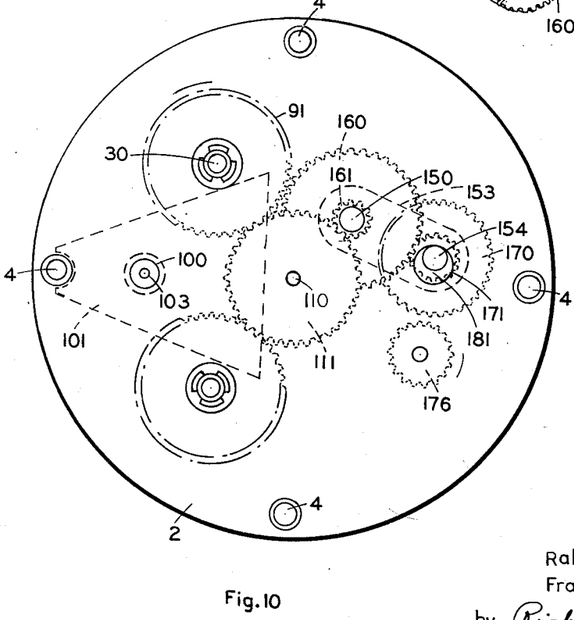
Fig. 10 is a rear elevation of a circuit controller with the terminal strip and electromagnetic mountings removed to show the relationship of the gears associated with the driving member, the gear reduction unit, the driven members and the latch trip means.

Adjacent both the separated motor pinion 176 and the gear 111 of the driven member as best shown in Fig. 10 is mounted the gear reduction unit, comprising a pair of parallel shafts 150 and 154 interconnected by a plate 153, which cooperates with the driven member to perform the timing function of the circuit controller. The gear reduction unit is adapted to be mounted on the rear mounting plate so that one reduction gear is kept in permanent engagement with gear 111 while the other reduction gear is free to be swung into and out of engagement with the motor pinion. This is accomplished by mounting shaft 150 on the rear mounting plate for pivotal movement therewith while shaft 154 is mounted freely with an end protruding through an enlarged opening 181 in the rear mounting plate.

Parallel to the front mounting plate proximate gear 112 of the driven member, referring again to Fig. 1, is mounted a reciprocating actuator plate 190 adapted to be supported at one end by a grooved bushing 114 mounted on shaft 110 next to gear 112 of the driven member and by an opening 138 (Fig. 6) in the switch mounting plate 130 near the opposite end. A post 120 extending inwardly from the front mounting plate is provided with groove means to cooperate with the groove of bushing 114 and the opening in switch mounting plate to guide and support the reciprocating plate in its movements to actuate the appropriate switches. A gear 84 is mounted on post 120 so as to be in permanent engagement with a pinion gear 85 mounted on a shaft 86 which extends through the front mounting plate and also with a pinion gear 83 mounted on a rotatable bushing supported by shaft 30. A suitable knob 87 is fixed to shaft 86 to make manual rotation possible.

In its control of an external circuit, the circuit controller depends upon the operation of a pair of contact carrying elements to appropriate switching positions. To accomplish this a pair of control members 40 and 50 are mounted so as to be movable relative to each other. At the same time it is desired that the circuit controller be capable of repeating the cycle. To accomplish this, it is essential to reset the contact carrying elements to a predetermined position, but the resetting is to occur without change in the relative position of the contact carrying members whereby undesired switching is prevented. In order that both the switching occur during cyclic operation and switching be prevented during resetting, a pair of control members are provided to be adapted for independent relative movement during cyclic operation and for joint movement upon resetting. The manner in which this is accomplished is best seen by reference to Fig. 2 wherein a cross sectional view shows a pair of control members, generally desilgnated by numerals 40 and 50 which are mounted on a sleeve 31 which is slidable axially along shaft 30 between predetermined limits set by retaining rings 32 and 33 mounted in suitable grooves 34 and 35 on shaft 30.

Control member 50 comprises a bushing 51 having a bore therethrough for concentric mounting on sleeve 31. The bore is large enough to permit relative movement of control member 50 along sleeve 31. A cylindrical spool 52 is fixedly mounted on one end of bushing 51 in any well known manner and has an annular groove 53 in its outer surface to receive the end of contact carrying element 143. On the opposite end of bushing 51 is mounted part of the latching means comprising a rigid plate 55 adapted to pivotally support a latch pin 70 at one end and to rigidly support a turning peg 78 at the other end. A biasing plate 56 which cooperates with rigid plate 55 through springs 57 and 58 to hold latch pin 70 against radial movement sets in guiding grooves 59 on bushing 51. Between the latch means and the cylindrical spool 52 is a circular plate 54 of insulating material which serves as an arc shield.

Control member 40 has a like construction comprising bushing 41 and spool 42 with groove 43 for engaging the free end of contact carrying element 142. Associated latching means in the form of rigid plate 45 pivotally supports latch pin 70 on one end and rigidly supports turning peg 68 on the opposite end. Biasing plate 46 is anchored to plate 45 by means of spring 47 and 48 and is movable in guiding grooves 49 in bushing 41. A circular insulator shield 44 is mounted between the spool 42 and the associated latching means.

A pair of retaining rings 36 and 37 are mounted in appropriate grooves near opposite ends of sleeve 31 to define the limits of movement of the control members relative to the sleeve during cyclic operation and to fix the relative position of the control members during resetting.

In the operation of the circuit controller in a cyclic manner, it is preferred that the switching positions occur under force supplied by energy stored in the contact carrying elements. This energy is imparted to the contact carrying elements by moving them to a predetermined position against their bias. The movement is done through the control members which are moved axially along shaft 30 under the compulsion supplied by energy stored in reset spring 102 acting through reset plate 101. When moved to the predetermined position, latching of the control members is performed to restrain them against return movement.

Latching of control member 50 occurs when its associated latch pin 70 moving in a groove 75 in latch plate 74 reaches the position where the shoulder between shank 72 and neck 71 of latch pin 70 clears the edge of latch tongue 76. Because of the biasing action of the plate 56 and springs 57 and 58 associated with rigid plate 55 on control member 50, the neck of latch pin 70 is held against the end of tongue 76 until a positive tripping force is applied to effectuate pivotal movement to latch free position. Latch plate 74 is adapted to maintain a fixed axial position by being mounted in any well known manner to a bushing 90 which is fixedly mounted to shaft 30 at a position between retaining 33 and the rear mounting plate.

Latching of control member 40 occurs in a like manner when its associated latch pin 60 moving in groove 65 in latch plate 64 reaches the position where the shoulder between shank 61 and neck 62 of the latch pin clears the edge of latch tongue 66. Because of the biasing action of plate 46 and springs 47 and 58 associated with rigid plate 45 on control member 40, the neck of latch pin 60 is held against the end of tongue 66 until a positive tripping force is applied to effectuate a pivotal movement. Latch plate 64 is adapted to maintain a fixed axial position by being mounted in any well known manner to a bushing 80 which is mounted on shaft 30 between the retaining ring 32 and the front mounting plate.

The switching which occurs during the cyclic operation of the circuit controller is effectuated by changing the relative positions of the contact carrying elements. After their movement against their bias to the predetermined position where latching occurs, the change in switching position depends upon tripping latch pins 70 and 60 by some positive force.

The tripping of latch pin 70 for the release of control member 50 occurs when cam surface 92 on gear 91 is moved into engagement with the extending head 73 of latch pin 70. To perform the tripping function, gear 91 is mounted on bushing 90 for rotative movement relative thereto and is held against axial movement by latch plate 74 already described as mounted on one end of bushing 90 and a retaining ring 93 mounted on the other end of bushing 90 nearest the rear mounting plate. A cup-shaped spring member 94 is also mounted on bushing 90 so as to bear against retaining ring 93 to hold it in fixed position on bushing 90 and also to bear against a disk washer 95 mounted next to the rear mounting plate. A spacing ring 96 is provided between disk washer 95 and spring member 94 to maintain spring member 94 in position on bushing 90. Thus assembled, spring member 94 serves additionally as a friction member to resist rotation of shaft 30. A similar construction is supplied to provide tripping means for latch pin 60 comprising a gear 81 having cam surface 82 extending from a face of gear 81 so as to be adapted to engage the head 63 on latch pin 60 when the appropriate relative position is assumed. Gear 81 is mounted for free rotation on bushing 80 and is held against axial movement by latch plate 64 fixedly mounted on one end of bushing 80 and pinion gear 83 fixedly mounted on the opposite end of bushing 80.

The times during the cycle of operation of the circuit controller at which the switching occurs depends upon the time at which tripping occurs to release the control members for relative movement under force supplied by the contact carrying elements. The times at which the tripping occurs depends upon the relative angular positions of the latch pins where the relative angular positions of the tripping cams and the speed of rotation of their gears are the same as in the preferred embodiment. It is an additional feature of this invention that the times when tripping occurs be variable in accordance with a preselected desire over a varying range determinative only by the length of timing cycle.

The angular setting of latch pin 70 is acquired by rotation of shaft 30 by means of an appropriate knob 38. Because bushing 90 is fixed to shaft 30 and latch plate 74 is fixed to the bushing, latch pin 70 which is in groove 75 of the latch plate 74 is subjected to a moving force. Because of the pivotal connection of latch pin 70 with rigid plate 55 on control member 50, a possibility of lag in rotative movement of control member 50 and concomitant misalignment and binding of parts may occur to give a poor operative result. To prevent these harmful consequences, latch plate 74 is provided with a groove 77 adapted to receive a rigid turning peg 78 which extends from the rigid plate 55 of control member 50. Through the combined interaction of the turning peg and the latch plate, upon rotation, the entire control member 50 and its associated latch pin 70 is moved to an angular position determined by the rotation of shaft 30. In this operation the annular groove 53 in spool 52 serves to maintain the engagement of spool 53 with contact carrying element 143 while permitting the rotative movement of the control member.

The angular setting of the latch pin 60 is acquired in a similar manner. A bushing 80, mounted loosely on shaft 30 so as to permit independent rotation of the bushing 80, and its associated latch plate 64, which is equipped with a groove 67 to engage a turning peg 68, are rotatable through a pinion gear 83 adapted to be turned by a fixed gear 84 which is in engagement with a pinion 85 on an independent rotatable shaft 86 having setting knob 87.

In the embodiment shown in Figs. 1–5, it is possible for the tripping times to occur in sequence even though the latch pins occupy the same angular positions. This is made possible by the ninety degree relative settings of the cams. Appropriate time setting marks which may be provided on the face of the front mounting plate are made to take this into account. It is to be noted that any relative angular position of the cams and any appropriate marking of the time settings desired may be provided within the scope and spirit of the invention.

The initiation and termination of the timing cycle of the circuit controller depend upon the engagement and disengagement of the gear reduction unit and the driving pinion 176. Since the clutching operation is performed by a solenoid, the engagement and disengagement of the gear reduction unit and the driving pinion depend upon the energization and de-energization of the solenoid adapted to operate a mechanical linkage.

The energization of the solenoid occurs as the result of the closing of an initiator contact switch having contact elements 133 and 134 which are in normally open position while de-energization occurs as a result of the opening of the limit switch having contact elements 135 and 136. The operation of both the initiator switch and the limit switch is performed by the reciprocating actuator plate 190 which is designed to be supported by switch mounting plate and the driven member.

Figure 6:
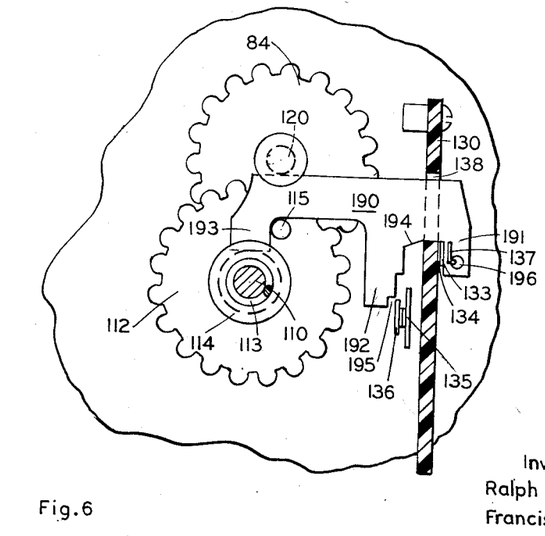
Fig. 6 is a partial view taken along line 6 in Fig. 1 with details omitted for clarity showing the reciprocating actuator and associated operating and operated mechanism in cycle initiating position.
Figures 7, 8:
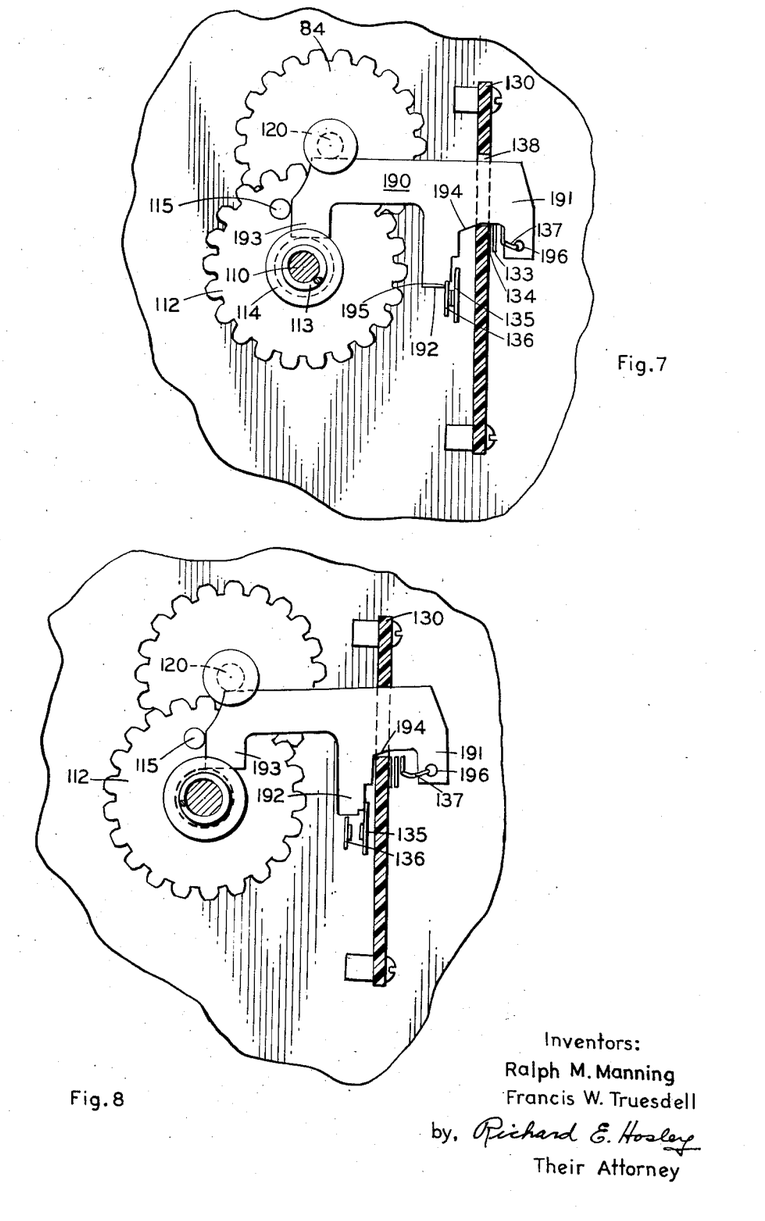
Fig. 7 is a partial view taken along line 6 in Fig. 1 with details omitted for clarity showing the reciprocating actuator and associated operating and operated mechanisms in position prior to termination of cycle.
Fig. 8 is a partial view taken along line 6 in Fig. 1 with details omitted for clarity showing the reciprocating actuator and associated operating and operated mechanisms in position upon termination of cycle.

As best disclosed in Figs. 6–8 actuator plate 190 has a pair of switch operating arms 191 and 192. When mounted, the actuator plate is supported by the switch mounting plate between the arms so that the arms extend along the opposite sides of the mounting plate. Thus mounted, arm 191 is adapted to operate the initiator switch while arm 192 is adapted to operate the limit switch. Since the limit switch is normally closed, its operation depends upon the separation of contacts to terminate the timing cycle. This separation should desirably occur in a snap manner. Snap action is obtained through the provision of a cam edge 194 between the arms 191 and 192 and a notch 195 in arm 192. The effect achieved by the cam edge 194 and the notch 195 when movement of the actuator plate 190 occurs results in the desired snap action of contact 136 only, to thereby open the limit switch.

The movement of the reciprocating actuator plate 190 which results in the operation of the switches depends upon the force supplied by a peg 115 which engages the opposite edges of a third arm 193 as the peg is moved in a circular path in an oscillating manner around the end of the arm 193. The peg 115 is fixed to gear 112 of the driven member and rotates therewith in one direction when driven by the driving pinion operating through the gear reduction unit, and rotates therewith in the opposite direction under compulsion of coil spring 113 which releases its wound up energy when the disengagement of the gear reduction unit and driving pinion takes place.

Figure 9:
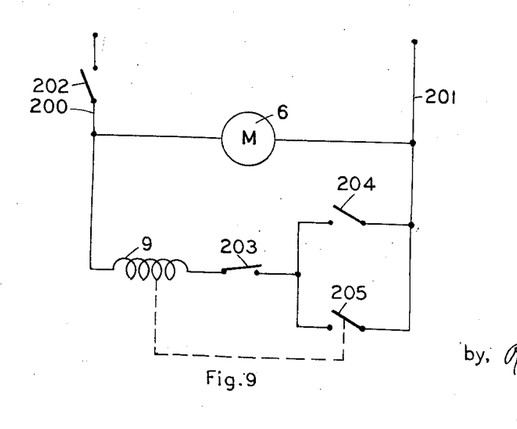
Fig. 9 is a circuit diagram of a circuit controller embodying the principles of this invention.

Fig. 9 discloses an electric circuit capable of initiating and terminating the the timing cycle within the scope and spirit of the invention where it may be desired to have a continuously operating motor with automatic repetition of the timing cycle. As described, electric motor 6 is connected across lines 200 and 201 with a manual switch 202 in line 200 to close the circuit to a suitable voltage source. A branch circuit connected in parallel with motor 6 comprises the coil 9 of solenoid 7 connected in series with the normally closed limit switch 203 and a parallel branch comprising normally open initiator contact switch 204 and holding switch 205. Limit switch 203 is that switch previously described having contacts 135 and 136. Initiator contact switch 204 and holding switch 205 have been previously described having contact elements 133 and 134 and 140 and 141 respectively. The holding switch is operated by the reset mechanism which is linked to the solenoid, while, as previously described, the limit and initiator switches are operated by the reciprocating actuator plate 190.

The operation of the gear reduction unit by the solenoid 7 is performed through the agency of a mechanical linkage connecting the parts. Since the resetting operation of the main switch is also controlled by the solenoid, the two operations, resetting and clutching, may be performed by a common operating element. Referring to Figs. 1 and 2 it is seen that such a common element is disclosed in the form of a bell crank 21. In its preferred form, bell crank 21 comprises a flat piece of metal stock adapted to receive projections 14 and 15 of hinge plate 12 to form a hinge connection. Appropriate openings are provided in the bell crank to receive the ends of suitable connector rods such as 18, shown in Fig. 2 and 177 shown in Fig. 14.

As shown in Fig. 2 connector rod 18 may be formed at one end to be connected to brackets 16 of armature 10 by pin 17 in any suitable manner. The connector rod is of a length permitting extension through an opening in the bell crank and is threaded to receive adjusting nut 22 and locking nut 21 on the protruding end thereof. A spring member 20 is mounted on connector rod 18 in a manner whereby it exerts a force upon the bell crank to keep it in contact with the adjusting nut 22. An appropriate retaining element 19 is mounted on connector rod 18 to cooperate with the bell crank to maintain spring 20 in compression. Element 19 may be threaded onto connector rod to make possible the adjustment of compression supplied by spring 20.

Figure 14:
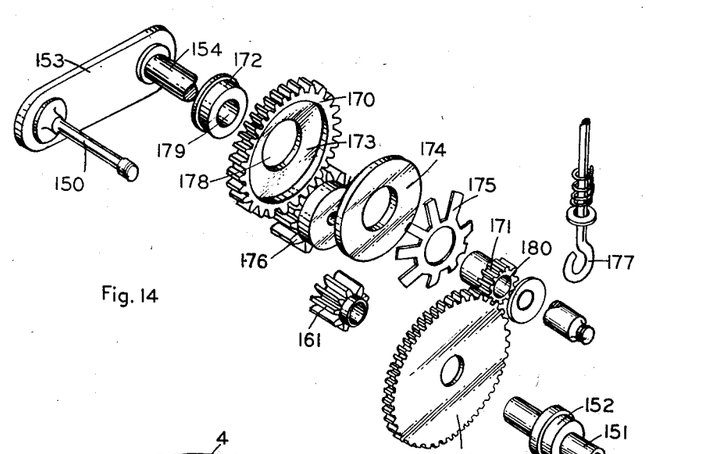
Fig. 14 is an isometric exploded view to show clearly the details of construction of the gear reduction unit.

The connection of connector rod 177 to bell crank 21 may be made in like manner with the opposite end of connector rod 177 being formed to receive the end of shaft 154 of the gear reduction unit as shown in Fig. 14 in any well known manner so as to permit slight turning movement between the parts during swinging movement of shaft 154.

In the operation of the resetting mechanism, bell crank 21 is provided with an arm 24 which is integral therewith and may be formed by cutting into the bell crank and bending the arm out of the plane of the bell crank. As best shown in Fig. 2, the arm 24 extends downwardly from the bell crank 21 toward the hinge plate 12 where it makes a free connection with a reset actuator plate 25. Reset actuator plate 25 is adapted at one end to be mounted on a pivoting pin 26 which extends from the hinge plate 12 to the rear mounting plate, and at a point intermediate the ends to receive a reduced end 103 of reset rod 100. Under force supplied by reset spring 102 the free ends of arm 24 and reset actuator plate 25 are kept in constant frictional engagement.

In Fig. 14 where the gear reduction clutch unit is shown in detail, shafts 150 and 154 are mounted in any well known manner to connecting plate 153. On shaft 150 is mounted reduction gear comprising spur gear 160 and pinion gear 161 which are adapted to be fitted together for rotation as a unit. Openings in the gears 160 and 161 permit the reduction gear to be mounted for rotation on shaft 150. A tubular fitting 151 having a concentric bushing 152 fixed thereon is mountable over the end of shaft 150 and serves as a bearing in which shaft 150 turns in a pivoted manner. Fitting 151 further serves to hold reduction gear in fixed rotative position on shaft 150 while bushing 152 serves to hold the tubular fitting 151 in fixed position in an opening in the rear mounting plate.

On shaft 154 is mounted a reduction gear comprising spur gear 170 and pinion gear 171. The gears are held together by a retaining member in form of hollow cylindrical bushing 172 which is adapted to be inserted through opening 178 in spur gear 170 and to receive pinion gear 171 in its opening 179. Shaft 154 passes through an opening in the pinion gear 180 to support the entire assembly.

To provide means for absorbing rotative energy to prevent rebounds upon resetting of the rotative components, a friction disk 174 is mounted concentrically about retaining member 172 in a sunken face 173 of spur gear 170. Adapted to be held between the pinion gear 171 and the friction disk 174 is a compression member in the form of a resilient cup-shaped spring 175.

Figure 11:
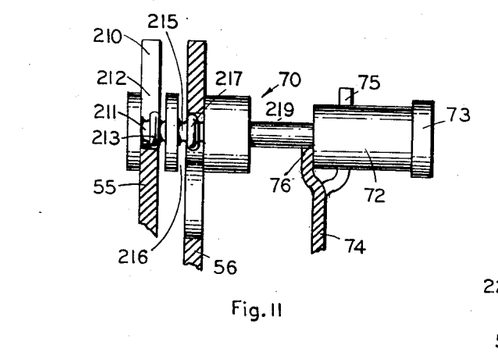
Figs. 11 and 12 are fragmentary views of a center line section showing details of structure relating to the latch means.
Figure 12:
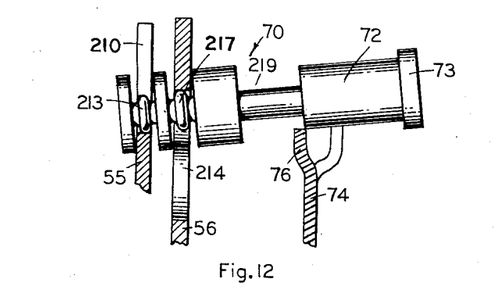
Figure 13:
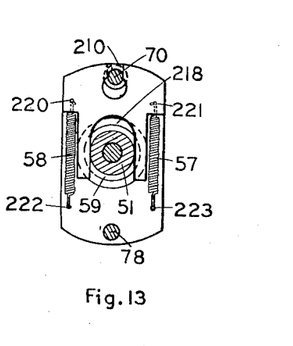
Fig. 13 is an elevation of the latch means and control member taken along section line 13 in Fig. 2.

A better understanding of the construction of the latch means is acquired by reference to Figs. 11–13, of which Figs. 11 and 12 are fractional views taken along a center section line and greatly enlarged to show details of construction of the latch pins 70. Fig. 13 is an end section showing the relative assembly of latch pin support plates with other details of circuit controller structure omitted for purposes of clarity.

As already described, the latch means comprises elements movable axially relative to each other while being rotatively movable together with interconnecting elements adapted to align and guide as well as to lock together. The axially movable elements comprise a rigid plate fixedly mounted to a control member and a biasing plate coacting with a latch pin to perform the latching function to a latch plate. Since the latch means for each control member is essentially the same, only one description will be made.

In Fig. 11 the latch means is shown in latching array while in Fig. 12, the latch means is shown at the release stage prior to axial movement of the control member. The operation of the latch means is pivotal in nature. The pivoting of latch pin 70 occurs with respect to the rigid plate 55. A pivotal engagement between the latch pin 70 and the rigid plate 55 is acquired by providing an open end slot 210, which may be U-shaped, in the end of the rigid plate of a width large enough to accommodate the reduced portion 211 of latch pin 70 in groove 212 made near the end of the pin. The groove 212 is wider than the width of plate 55 to prevent a binding effect. The groove 212 may also be cut so that an annular rounded ridge 213 is formed in the base thereof so that pivotal motion is enhanced by rocking of the ridge on the edge of plate 55 at the bottom of slot 210.

A resistance to pivoted motion is provided through a biasing means to assure a tendency of the latch pin to assume the latching position. The biasing means comprises a biasing plate 56 having a keyhole 214 therethrough. The large portion of the keyhole enables the latch pin to pass therethrough to become engaged with rigid plate 55 during assembly while the narrow portion of the keyhole is adapted to receive the reduced portion 215 of latch pin 70 in an annular groove 216 near and parallel to groove 212. An annular rounded ridge 217 may be provided in the reduced portion 216 to limit friction between the edge of the guide plate keyhole and the reduced portion during pivotal motion.

As best shown in Fig. 13, the guide plate 56 takes a regular shape having holes 220 and 221 on opposite sides of the center line to anchor a pair of coil springs 57 and 58 which are connected to rigid plate 55 in like manner in holes 222 and 223. A U-shaped cutout 218 is provided centrally to enable the biasing plate to straddle the bushing 51 in groove 59 provided for the purpose. When pivotal movement of latch pin 70 occurs, the biasing plate 56 moves radially outwardly from the bushing 51 against the biasing force of coil springs 57 and 58 with the biasing plate being guided in its movement by the groove 59.

Approximately centrally located in the latch pin 70 is an elongated groove 219 into which the end of latch tongue 76 of latch plate 74 extends to cooperate with the shoulder portion of shank 72 in latching the parts together. A head 73 is provided on the end of the latch pin 70 to cooperate with cam surface 92 to impart the pivotal motion. As already described, the head may also serve to provide a limit to axial movement of the control member by engaging the latch plate in the vicinity of slot 75.

The operation of the circuit controller, as described in its preferred embodiment, is as follows: Assuming that electrical connections have been made as shown in Fig. 9 and that switch 202 has not been closed, it is first essential to establish the times at which the contact carrying elements will be released to assume the switching positions best shown in Figs. 3–5, although setting of the times of release may be performed during the operation of the circuit controller. As shown in these latter figures, contact carrying element 143 is released first and contact carrying element 142 is released at a discreet period thereafter. It becomes necessary therefore to set the time for release of contact carrying element 143 so that cam 92 trips latch pin 70 first. Knob 38 is turned so that its indicator mark (not shown) registers with an appropriate calibrating mark on front mounting plate (not shown). Shaft 30 is thereby rotated with its bushing 90, bearing latch plate 74, to an angular setting. Because of the interconnecting latch pin 70 and turning peg 78, control member 50 is likewise rotated. The loose mounting of the control member 50 on sleeve 31 and the loose interengagement of contact carrying element 143 with spool 52 in groove 53 permit rotation of the control member.

The time at which contact carrying element 142 will be released is established by turning knob 87 to its appropriate calibration setting. Turning of knob 87 results in turning pinion 85 and intermediate gear 84 which engages pinion 83 on bushing 80. Bushing 80, being mounted loosely on shaft 30, will rotate freely with latch plate 64. The interconnection of latch pin 60 and turning peg 68 result in rotation of control member 40 on sleeve 31. The timing interval of switch operation depends, then, upon angular positioning of the latching means. As shown in Figs. 1–5 the latching pins are actually aligned for a particular interval. It is possible to have them aligned and still attain a timing interval because of an approximately ninety degree setting of the cams with respect to each other. Since the cam bearing gears are rotated together, the marking of time settings on an appropriate part of the controller will necessarily take into account the ninety degree relative displacement of the cams 82 and 92. It is to be understood, however, that any setting of gears or calibration may be had without departing from the spirit or scope of the invention.

Figure 3:
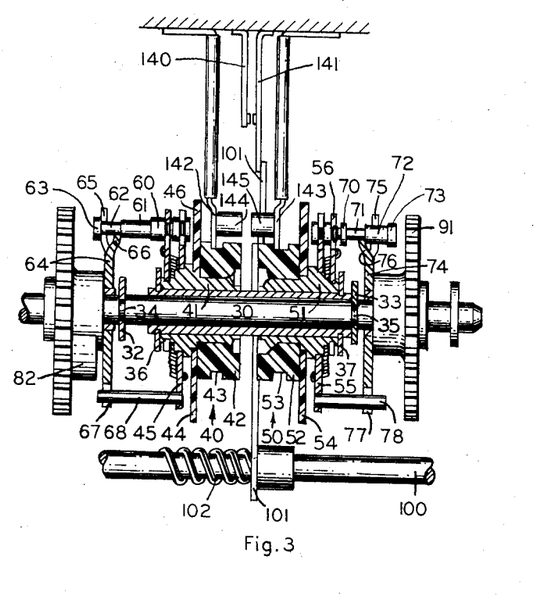
Fig. 3 is a partial view in partial section along line 2 in Fig. 1 showing the main contact carrying elements in their position at the point of resetting just prior to the initiation of the timing cycle.
Figure 5:
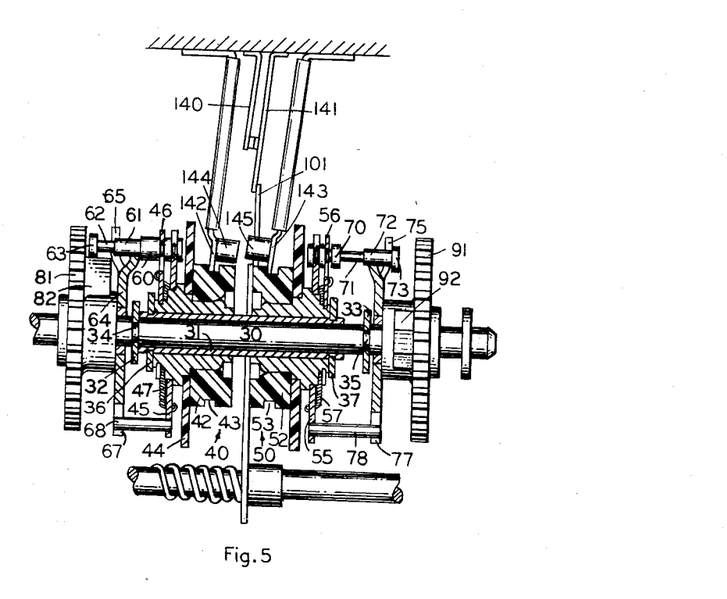
Fig. 5 is a partial view in partial section along line 2 in Fig. 1 showing the main contact carrying elements in circuit opening position subsequent to tripping of the latch associated with the second contact carrying means and prior to resetting of the contact carrying elements.

Prior to energization of the circuit controller motor, it is to be noticed as shown in Figs. 1–3, that reset rod 100 under the compulsion of compression spring 102 has been moved to the limit of its reset position, and that reset plate 101 bearing on control member 50 has moved the control member assembly from the limiting position shown in Fig. 5. This results in the movement of contact carrying elements 142 and 143 against their bias into a predetermined position while maintaining a first switching position. Because of the operation of the latching means the contact carrying elements are restrained from moving until tripping occurs. It is also a condition prior to energization of the circuit controller motor that the reduction gear unit be disengaged from motor 6. In the de-energized condition, with switch 202 open, reciprocating actuator plate 190 has been moved to its limiting position by an unwound coil spring 113 on shaft 110 resulting in peg 115 of gear 112 to bear upon arm 193 of said plate. With the reciprocating actuator plate 190 in its limiting position corresponding to the de-energized and therefore declutched state, contact switch 204, which is in series with the limit switch 203 and solenoid coil 9, will be closed.

If switch 202 in the circuit of Fig. 9 is closed, electric motor 6 becomes energized and solenoid 9 likewise becomes energized. Under energized conditions, armature 10 is moved resulting in pivoting of the bell crank 21 about its hinge. Spur gear 170 is brought into engagement with motor pinion 176 and reset rod 100, through the pivotal motion of reset rod actuator plate 25, is moved in a direction so as to further compress spring 102, which resists this motion, resulting in movement of reset plate 101 away from control member 50 and into engagement with contacts 140 and 141 of the holding switch. With proper adjustment of the adjusting means associated with the connector rod 18 and bell crank 21, the reset rod 100 will move a limited distance so as to free control member 50 for axial movement on sleeve 31 but at the same time will not engage the control member 40.

The engagement of the reduction gear results in the turning of the central driven member putting spring 113 under torsional compression to store energy for later resetting the latch trip elements and the reciprocating actuator plate. Upon the turning of the gear 112 of the driven member, peg 115 is rotated out of engagement with arm 193 of reciprocating actuator plate 190. Under the force of a wire spring 137 suitably anchored at one end to switch mounting plate 130 and engaging reciprocating actuator plate 190 in any suitable manner as at 196 in Figs. 6–8, the reciprocating actuator plate is moved a slight distance so as to allow contacts 133 and 134 to separate. Since holding switch 205 is in circuit closed position by virtue of the engagement of contacts 140 and 141 with reset plate 101, the solenoid will remain energized, thus providing for continued operation of the timing mechanism which will ultimately result in the operation of the main switch.

Figure 4:
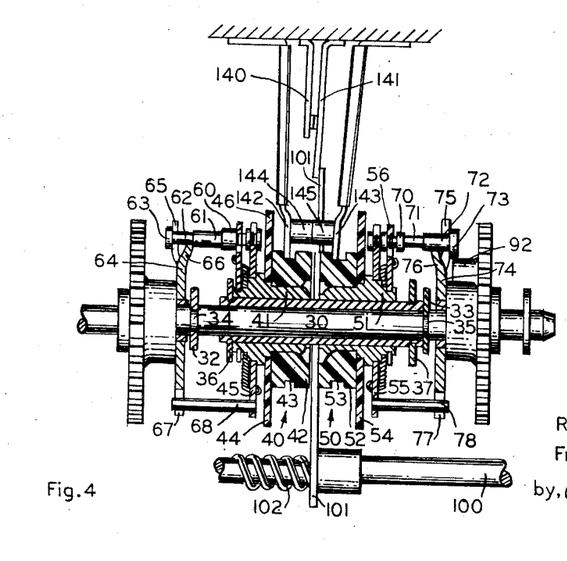
Fig. 4 is a partial view in partial section along line 2 in Fig. 1 showing the main contact carrying elements in circuit closing position subsequent to tripping of the latch associated with one contact carrying element.

The engagement of the spur gear 170 to motor pinion 176 results in rotation of spur gear 160 through pinion gear 171 with its pinion gear 161 driving gear 111 of the driven member which in turn rotates the cam bearing gears 81 and 91 bringing the cams into position for tripping latch pins 60 and 70. As shown in Fig. 4, cam gear 91 has been rotated counterclockwise to bring cam 92 from its initial position best shown in Fig. 1 (being hidden in Fig. 3) to engage head 73 on latch pin 70 so as to result in pivoting of the pin 70 in its slotted mounting on support plate 55. The movement of latch pin 70 by cam 92 results also in movement of plate 56 against the force of springs 57 and 58 and in the clearing of tongue 76 in latch plate 74 by shank 72 on latch pin 70. The energy stored in contact carrying element 143 is released to move it to a second switching position. In this position contacts 144 and 145 may be brought together to close an external electrical circuit.

Under the force imparted by contact carrying element 143, control member 50 has moved axially relative to sleeve 31 compelling all the attached elements to move therewith. Both latch pin 70 and turning peg 78 move with respect to latch plate 74 in their respective grooves 75 and 77. Latch pin 70 is supported during movement by the engagement of shank 72 on the edge of tongue 76. A positive limitation on the length of movement by control member is provided in the form of head 73 which is designed to bear upon the edges of the groove 75 in latch plate 74.

During the axial movement of control member 50, cam gears 81 and 91 continue rotating under torque supplied through the gear reduction unit and the driven member. Cam 82 on gear 81 continues changing its rotative position, hidden in Fig. 4, until it reaches the position of contact with the head 63 on latch pin 60 as shown in Fig. 5. The resultant contact raises pin 60 against the tension provided by springs 47 and 48 acting on plate 46 so that shank 61 clears the edge of tongue 66 in latch plate 64, and contact carrying element 142 is free to move with its bias whereby the first switching position is reassumed. Under the force imparted after tripping by the contact carrying element, control member 40 moves axially with respect to control member 50. Since bushing 41 of control member 40 is in contact with retaining ring 36, sleeve 31 is compelled to move axially in sliding manner along shaft 30. The positive stop element 73 on latch pin 70 prevents further movement of control member 50 with said sleeve 31 so that both control member 40 and the sleeve 31 move relative to control member 50. During movement of the sleeve 31 and control member 40, latch pin 60 and turning peg 68 move axially with respect to latch plate 64 in their respective slots 65 and 67 with shank 61 of latch pin 60 bearing upon the edge of tongue 66. The limit of axial movement of the control member 40 may be determined by a shoulder on latch pin 60 or by the movement of the retaining ring 37 on sleeve 31 into engagement with bushing 51 of control member 50. In any case, the design of the length of the distance of axial movement of the parts is such that retaining ring 37 on sleeve 31 is brought to bear against bushing 51 in preparation for resetting by returning the sleeve 31 and the control members to the predetermined initial position while holding the contact carrying elements in unchanged relative position.

The contact carrying elements 142 and 143 having assumed the switching positions so as to energize and de-energize an external electric circuit according to predetermined settings, the entire control member assembly is ready for resetting. Before resetting can be performed, however, the timing cycle must be terminated. Depending on the setting of the latching means, the timing cycle may be terminated immediately upon the movement of control member 40 or may continue for a discreet period of time thereafter. In either case, the termination occurs, referring to Figs. 7 and 8, when the gear 112 bearing peg 115 rotates to a degree such that peg 115 is brought to bear upon the edge of arm 193 of actuator plate 190 so that arm 192 is brought into engagement with the contacts 136 and 135 of the limit switch. As the peg moves the reciprocating actuator toward the switch mounting plate, the edge of arm 192 is brought into contact with the limit switch such that contact element 136 fits into notch 195 located near the tip of arm 192. Continued lateral movement of the actuator plate results in the movement of both contact elements 136 and 135 against their bias at the same time keeping them in closed switching position.

During the lateral movement, a second movement occurs which tends to lift the actuator plate 190 so that contact element 136 is no longer held in position in notch 195. This lifting action occurs through the camming effect brought about by the cam edge 194 between arms 191 and 192 of reciprocating actuator plate 190 as it moves on the supporting edge provided in opening 138 in switch mounting plate.

The effect of the lifting action is to move arm 192 upwardly so that it is moved out of engagement with contact element 136. Because of the energy stored in the contact element 136, it snaps past the end of arm 192 to its bias position. The separation of the contacts is accomplished by making contact element 135 larger in width so that it is restrained from moving to its bias position by coming in contact with arm 192 when 136 is released.

As seen in Fig. 9, the opening of the limit switch de-energizes coil 9 of solenoid 7. The electromagnetic force which overcomes the spring force in compressed spring 102 no longer exists. Force being applied through reset rod 100 to reset rod actuator plate 101 causes said plate to pivot about pin 26 to move bell crank 21 about its hinge connection. The resultant movemen of bell crank 21 results in the declutching of the gear reduction unit and the lifting of the movable armature 10 of the solenoid.

The reset rod 100 moves the reset plate 101 into engagement with control member 50 and releases the holding contacts 140 and 141 to their normally open position. With energy supplied by spring 102, sleeve 31 is moved axially along shaft 30 with the control members 40 and 50 to reset the contact carrying elements 142 and 143 to the predetermined position and latching reoccurs.

In the resetting operation, bushing 51 of control member 50 bears against retaining ring 37. As the reset plate continues to exert its force on bushing 51, the bushing 51 and sleeve 31 are moved axially along shaft 30. The control member 40 being in contact with retaining ring 36 is compelled to move with the sleeve 31. Thus it is seen that the movement of the control members is accomplished simultaneously, and with the proper dimensioning of parts, the relative separation of the control members never changes during resetting. Since the contact carrying elements are constantly in engagement with the control members, this means that the contact carrying elements are moved from their bias position to a resetting position without changing the relative positions of the contact carrying elements.

During the resetting operation, it is also to be observed that the latching means are reconditioned to hold the control members in position for the next operation of the contact carrying elements. During resetting, the turning pegs 68 and 78 on support plates 45 and 55 move in slots 67 and 77 of latch plates 64 and 74 to guide the axially moving control members in relation to the latch plates. Thus, it is assured that latch pins 60 and 70 are aligned to move freely in the grooves 65 and 75 of the latch plates. During this movement shank 61 of latch pin 60 and shank 72 of latch pin 70 bear on the edges of the tongues 66 and 67. When the distance traversed is great enough, the latch pins 60 and 70, under the forces applied by coil springs 47 and 48 and 57 and 58 acting upon plates 46 and 56, are pivoted so that the tongues 66 and 76 move into engagement with necks 62 and 71 and come into contact with the shoulders on the ends of shanks 61 and 72 to lock the control members against movement reverse to resetting movement.

It is also to be observed that during the resetting operation of the control member assembly, the cam bearing gears 111 and 112 are being returned to their initial rotative positions under the action of the winding spring 113 which supplies turning force when the gear reduction unit is disengaged from the driving pinion. With the unwinding of spring 113, peg 115 on gear 112 is moved out of engagement with the edge of arm 193 of reciprocating actuator plate 190. Allowed freedom of movement, the reciprocating actuator plate will move out of engagement with contact 135 under spring biasing forces supplied by both contact element 135 and spring 137 which is connected to arm 191. It is thus seen that the separation of the holding switch contact elements 140 and 141 during resetting becomes important in order to maintain de-energization of the solenoid until resetting and reconditioning of the moving parts is complete. The repetition or reinitiation of the operating cycle, with holding switch open is intended not to occur until peg 115 on gear 112 rotates to its initial rotative position so as to re-engage arm 192 of recpirocating actuator plate 190 to move said plate in a direction against the force of wire spring 137 so as to close initiator contact switch 204 by engagement with contact elements 133 and 134 which serve to re-energize the solenoid when limit switch 203 is closed.

It is also to be noticed that the arm 191 of reciprocating actuator plate 190 which serves primarily as an actuator of initiator contact switch 204 to energize solenoid 7 also serves the useful function of limiting the distance traversed by the reciprocating actuator plate 190 and in turn the distance traveled by the rotating peg 115. In other words, the actuator plate 190 is a stop mechanism as well as a contact operator. It is thus seen that the limits of movement of the reciprocating actuator plate correspond to and define the rotative limits of movement of the peg 115 and the central driven member with which it is operatively associated.

Figs. 2 and 10 show an application of the embodiment of the invention wherein a second set of contact carrying elements with separate control members, latch means and trip means, as well as latch adjusting means are provided whereby a second external circuit may be controlled independently within the time cycle established by the circuit controller with resetting of the contact carrying elements and driving of the latch trip means being operated by the same mechanisms to perform the functions described in greater detail previously.

Therefore while a particular embodiment of the subject invention has been shown and described herein, it is in the nature of description rather than limitation, and it will occur to those skilled in the art that various changes, modifications and combinations may be made within the province of the appended claims, and without departing either in spirit or scope from the invention in its broader aspects.

What we claim as new and desire to secure by Letters Patent of the United States is:

1. A circuit controller comprising in combination, first and second contact carrying members, a movably mounted support member having a predetermined position, first and second control members movably mounted on said support member and cooperating with said first and second contact carrying members respectively to control the relative spacing thereof, said control members having a first relative position on said support member corresponding to a first switching position of said contact carrying members, means to move said first control member relative to said support member and to said second control member, said first contact carrying member moving with said first control member to establish a second switching position, means to move said support member and said second control member relative to said first control member, said second contact carrying member moving with said second control member to re-establish said first switching position, and means to return said support member to said predetermined position without changing the relative position of said control members.

2. A circuit controller comprising in combination, first and second contact carrying members, a slidably mounted support member having a predetermined position, first and second control members slidably mounted on said support member and having means for engaging said first and second contact carrying members respectively to control the relative spacing thereof, said control members having a first relative position on said support member corresponding to a first switching position of said contact carrying members, means to slidably move said first control member relative to said support member and to said second control member, said first contact carrying member moving with said first control member to establish a second switching position, means to slidably move said support member and said second control member relative to said first control member, said second contact carrying member moving with said second control member to re-establish said first switching position, and reset means to return said support member to said predetermined position without changing the relative position of said control members.

3. A circuit controller comprising in combination first and second contact carrying members, a shaft, a movably mounted sleeve supporting member having a predetermined position on said shaft, first and second control members movably mounted on said sleeve supporting member, said control members comprising cylindrical bushings with means for engaging their respective contact carrying members to control the relative spacing thereof, said control members having a first relative position on said sleeve corresponding to a first switching position, means to move said first control member relative to said sleeve member and to said second control member, said first contact carrying member moving with said first control member to establish a second switching position, means to move said second control member and said sleeve relative to said first control member said sleeve moving along said shaft, said second contact carrying member moving with said second control member to re-establish said first switching position, and reset means to return said sleeve member along said shaft to said predetermined position without changing the relative position of said control members.

4. A circuit controller comprising in combination, first and second spring leaf contact carrying members capable of being biased to a predetermined position, a movably mounted support member having a predetermined position, first and second control members having a predetermined position, said first and second control members movably mounted on said support member and cooperating with said first and second contact carrying members respectively to control the relative spacing thereof, said control members having a first relative position on said support member corresponding to a first switching position of said spring leaf contact carrying members first and second latch means cooperating with said first and second control members respectively to maintain said control members in said predetermined position and said first relative position, a first latch trip means operating to release said first control member for movement relative to said support member and to said second control member, said first spring leaf contact carrying member moving said first control member and establishing a second switching position, a second latch trip means operating to release said second control member for movement of said second control member and said support member relative to said first control member, said second spring leaf contact carrying member moving said support member and said second control member relative to said first control member to re-establish said first switching position, and reset means to return said support member, said control members, and said contact carrying members to their respective predetermined positions without changing the relative position of said control members.

5. A circuit controller comprising in combination first and second contact carrrying members, first and second coaxial control members having a first predetermined position and cooperating with said first and second contact carrying members respectively to control the relative spacing thereof and to thereby establish a first switching position, means to move said first control member relative to said second control member to change the relative spacing of said contact carrying members to thereby establish a second switching position, means to move said second control member relative to said first control member to again change the relative spacing of said contact carrying members to thereby re-establish said first switching position, and means to return said control members to said first predetermined position without changing the relative spacing thereof.

6. A timer switch comprising in combination, first and second contact carrying members, a movably mounted support member having a predetermined position, first and second control members movably mounted on said support member and cooperating with said first and second contact carrying members respectively to control the relative spacing thereof, said control members having a first relative position on said support member corresponding to a first switching position of said contact carrying members, a first actuating means to move said first control member relative to said support member and to said second control member, said first contact carrying member moving with said first control member to establish a second switching position, a second actuating means to move said support member and said second control member relative to said first control member, said second contact carrying member moving with said second control member to re-establish said first switching position, timing means to operate said first and second actuating means at preselected times, and means to return said support member to said predetermined position without changing the relative position of said control members.

7. A timer switch comprising in combination, first and second spring leaf contact carrying members capable of being moved against their bias to a predetermined position, a movably mounted support member having a predetermined position, first and second control members having a predetermined position, said first and second control members movably mounted on said support member and cooperating with said first and second contact carrying members respectively to control the relative spacing thereof, said control members having a first relative position on said support member corresponding to a first switching position of said spring leaf contact carrying members, first and second latch means cooperating with said first and second control members respectively to maintain said control members in said predetermined position and said first relative position, a timing mechanism, a first latch trip means driven by said timing mechanism operating to release said first control member for movement relative to said support member and to said second control member, said first spring leaf contact carrying member moving said first control member and establishing a second switching position, a second latch trip means driven by said timing mechanism operating to release said second control member for movement of said second control member and said support member relative to said first control member, said second spring leaf contact carrying member moving said support member and said second control member relative to said first control member to re-establish said first switching position, and means to return said support member, said control members and said contact carrying members to their respective predetermined positions without changing the relative position of said control members.

8. A timer switch comprising in combination, first and second contact carrying members having a predetermined position, a shaft, a movably mounted support member having a predetermined position on said shaft, first and second control members having a predetermined position and movably mounted on said support member and cooperating with said contact carrying members to control the relative spacing thereof, said control members having a first relative position on said support member corresponding to a first switching position of said contact carrying members, first and second latching means cooperating with said control members to maintain them in said first relative position in said predetermined position, said latching means mounted on said shaft for indepedent rotative movement, first and second manually operated means to adjust the relative angular positions of said latching means, a timing mechanism, a first latch trip means driven by said timing mechanism to release said first control member, a first actuating means moving said first control member relative to said support member and said second control member, said first contact carrying member moving with said first control member to establish a second switching position, a second latch trip means driven by said timing mechanism to release said second control member, a second actuating means moving said second control member and said support member relative to said shaft and to said first control member, said second contact carrying member moving with said second control member to re-establish said first switching position, and means to move said support member said control members and said contact carrying members to their respective predetermined positions without changing the relative position of said control members.

9. A timer switch comprising in combination, first and second contact carrying members, first and second coaxial control members having a first predetermined position and cooperating with said first and second contact carrying members to control the relative spacing thereof and to thereby establish a first switching position, first and second latch means to maintain said first and second control members in said first predetermined position, a timing mechanism, a first latch release member operated by said timing mechanism to release said first control member, means to move said first control member relative to said second control member to change the relative spacing of said contact carrying members to thereby establish a second switching position, a second latch release member operated by said timing mechanism to release said second control member, means to move said second control member relative to said first control member to change the relative spacing of said contact carrying members and to thereby re-establish said first switching position, and means to return said control members to said first predetermined position without changing the relative spacing thereof.

10. A timer switch comprising in combination, first and second contact carrying members having a predetermined position, a rotatable shaft, a movably mounted support member having a predetermined position on said shaft, first and second control members having a predetermined position and movably mounted on said support member and cooperating with said contact carrying members to control the relative spacing thereof, said control members having a first relative position on said support member corresponding to a first switching position of said contact carrying members, a first latching means having a first latch pin carrying member affixed to said first control member and a first latch plate fixed to said shaft for rotative movement therewith, a second latching means having a latch pin carrying member affixed to said second control member and a second latch plate rotatably mounted on said shaft, said first and second latching means operating to maintain said control members in said relative position in said predetermined position, first and second manually operated means to adjust independently the relative angular positions of said latch plates, first and second alignment means fixedly mounted to said first and second latch pin carrying members respectively to cooperate with said first and second latch plates respectively to maintain alignments during rotative adjustments, a timing mechanism, a first latch trip means driven by said timing mechanism to release said first control member, a first actuating means moving said first control member relative to said support member and said second control member, said first contact carrying member moving with said first control member to establish a second switching position, a second latch trip means driven by said timing mechanism to release said second control member, a second actuating means moving said control member and said support member relative to said shaft and said first control member, said second contact carrying member moving with said second control member to re-establish said first switching position, and means to move said support member said control members and said contact carrying members to their respective predetermined positions without changing the relative position of said control members.

11. A timer switch comprising in combination, first and second contact carrying members having a predetermined position and capable of independent snap action, a manually rotatable shaft, a slidably mounted support member having a predetermined position on said shaft, first and second control members having a predetermined position and movably mounted on said support member and cooperating with said contact carrying members to control the relative spacing thereof, said control members having a first relative position on said support member corresponding to a first switching position of said contact carrying members, first and second latching means cooperating with said control members to maintain them in said first relative position in said predetermined position, said first latching means fixedly mounted on said shaft for rotative movement therewith whereby the angular position of said first latching means is adjustable, said second latching means mounted on said shaft for independent rotative movement and manually operated means to adjust the angular position of said second latching means, a timing mechanism, a first latch trip means rotatably mounted on said shaft driven by said timing mechanism to release said first control member whereby snap action occurs to cause said first contact carrying element to move relative to said first contact carrying element to establish a second switch position, said first control member moving relative to said support member and said second control member, a second latch trip means rotatably mounted on said shaft driven by said timing mechanism to release said second control member whereby snap action occurs to cause said second contact carrying element to move relative to said first contact carrying element to re-establish said first switching position, said second control member and said support member moving relative to said first control member, and reset means to move said support member said control members and said contact carrying members to their respective predetermined positions without changing the relative position of said control members.

12. In a timer switch having a pair of contact carrying elements adapted to perform switching operations at predetermined times in a time cycle, a driving member, a driven member, and an electromagnetic clutch means to control the engagement of said driving and driven members, means to control the energization of said clutch means comprising in combination, a reciprocating actuator member operated by said driven member, said actuator member having first and second spaced arms, a mounting plate, first and second contact switches, said switches mounted on opposite sides of said plate, means in said mounting plate for supportingly engaging said actuator member between said arms whereby said first arm operates said first contact switch at one limit of reciprocation and said second arm operates said second contact switch at a second limit of reciprocation to thereby control the time cycle of said timer switch.

13. In a timer switch having a pair of contact carrying elements adapted to perform switching operations at predetermined times in a time cycle, a driving member, a driven member, and an electromagnetic clutch means to control the engagement of said driving and driven members, means to control the energization of said clutch means comprising in combination, a reciprocating actuator member operated by said driven member and having a first and second limit of travel, a fixed mounting plate positioned to support said actuator for movement thereon, a first contact switch mounted on a first side of said mounting plate, a second contact switch on the opposite side of said mounting plate, said second contact switch having a pair of resilient contact carrying members having a biased position, a first arm on said actuator for operating said first contact switch at said first limit of travel to initiate said time cycle, a second arm spaced on said actuator from said first arm to engage said resilient contact carrying members for movement conjointly away from said biased position, and means on said actuator for effectuating release of one of said resilient contact carrying members at said second limit of travel whereby said time cycle is terminated.

14. In a timer switch having a pair of contact carrying elements adapted to perform switching operations at predetermined times in a time cycle, a driving member, a driven member, and an electromagnetic clutch means to control the engagement of said driving and driven members, means to control the energization of said clutch means comprising in combination, a reciprocating actuator member operated by said driven member and having a first and second limit of travel, a fixed mounting plate positioned to support said actuator for movement thereon, a first contact switch mounted on a first side of said mounting plate, a second contact switch on the opposite side of said mounting plate, said second contact switch having a pair of resilient contact carrying members having a biased position, a first arm on said actuator member for operating said first contact switch at said first limit of travel to initiate said time cycle, a second arm spaced on said actuator member from said first arm to engage said resilient contact carrying members for movement conjointly away from said biased position, and camming means between said first and second arms adapted to move said actuator member in a manner whereby one of said resilient contact carrying members is released at said second limit of travel whereby said cycle of operations is terminated.

15. In a timer having a pair of contact carrying elements adapted to perform switching operations at predetermined times in a time cycle, a driving member, a driven member, an electromagnetic means to control the engagement of said driving and driven members, timer means including said driven member to effectuate the operation of said contact carrying elements, and reset means controlled by said electromagnetic means to condition said contact carrying elements for said switching operations, means to control the energization of said electromagnetic means comprising a reciprocating actuator member operated by said driven member and having a first and second limit of travel, a fixed mounting plate positioned to support said actuator for movement thereon, a first contact switch mounted on a first side of said mounting plate adapted to be operated by said actuator at said first limit of travel to energize said electromagnetic means, a holding contact switch mounted on said mounting plate adapted to be operated by said reset means to continue the energization of said electromagnetic clutch means when said actuator is moving from said first to said second limiting positions, a second contact switch mounted on said mounting plate adapted to be operated by said actuator to de-energize said electromagnetic means at the termination of said time cycle whereby said driving and driven members are disengaged and said contact carrying elements are reset, and means to return said actuator to said first limit of travel.

16. In a timer switch having a pair of contact carrying elements adapted to perform switching operations at predetermined times in a time cycle, a driving member, a driven member, means to establish the predetermined times at which the contact carrying elements will perform said switching operations, means operated by said driven member to actuate said contact carrying elements at said predetermined times, a gear reduction unit adapted to be in constant engagement with said driven member and movable into engagement with said driving member to initiate said time cycle, reset means adapted to condition said contact carrying elements prior to initiation of said time cycle, electromagnetic means adapted to be connected to said gear reduction unit and said reset means, and means operable by said driven member to control the energization of said electromagnetic means to control the initiation of said cycle.

17. In a timer switch having a pair of contact carrying elements adapted to perform switching operations at predetermined times in a time cycle, a driving member, a driven member having a first limiting position, means to establish the times at which the contact carrying elements will perform said switching operations, means operated by said driven member to actuate said contact carrying elements at said predetermined times, a gear reduction unit adapted to be in constant engagement with said driven member and movable into and out of engagement with said driving member to initiate and terminate said time cycle, reset means adapted to condition said contact carrying elements between the termination and initiation of said time cycle, electromagnetic means adapted to be connected to said gear reduction unit and said reset means, means operable by said driven member to control the energization and de-energization of said electromagnetic means to control the initiation and termination of said time cycle, spring means associated with said driven member to return said driven member to said first limiting position upon termination of said cycle, and a friction coupling in said gear reduction unit adapted to absorb energy of said driven member upon return to its first limiting position.

18. In a switch having a movable contact carrying member capable of performing a switching function, the combination comprising a control member adapted to move with said contact carrying member to perform said switching function, and latching means carried by said control member so as to be movable therewith, said latching means including a rigid support member and a latch pin pivotally mounted thereon, and biasing means connected to said support member and said latch pin for pivotally biasing said pin toward a latching position.

19. In a switch having a movable contact carrying member capable of performing a switching function, the combination comprising a control member adapted to move with said contact carrying member to perform said switching function, and latching means carried by said control member so as to be movable therewith, said latching means including a rigid support member having a mounting slot therein, a latch pin pivotally mounted on said support member within said slot, and biasing means connecting said support member and said latch pin for pivotally biasing said pin within said slot toward a latching position.

20. In a switch having a movable contact carrying member capable of performing a switching function, the combination comprising a control member adapted to move with said contact carrying member to perform said switching function, and latching means carried by said control member so as to be movable therewith, said latching means including a rigid support plate having a slot therein, a latch pin mounted on said plate within said slot, a movable plate member mounted on said control member and in engagement with said latch pin so as to co-act with said support plate to form a pivotal connection for said latch pin, and resilient means connecting said movable plate member and said rigid support plate for pivotally biasing said latch pin toward a latching position.

21. In a switch having a movable contact carrying member capable of performing a switching function, the combination comprising a control member adapted to move with said contact carrying member to perform said switching function, and latching means carried by said control member so as to be movable therewith, said latching means including a rigid support plate having a slot therein, a latch pin mounted on said plate within said slot, a movable plate member mounted on said control member and having an opening therein for receiving an extended portion of said latch pin so as to co-act with said rigid support plate to form a pivotal connection for said latch pin, and resilient means connecting said movable plate member and said support plate for pivotally biasing said latch pin toward a latching position.

22. In a switch having a movable contact carrying member capable of performing a switching function, the combination comprising a control member adapted to move with said contact carrying member to perform said switching function, and latching means carried by said control member so as to be movable therewith, said latching means including a rigid support plate having a U-shaped slot therein, a movable plate mounted on said control member and having an opening therethrough, a latch pin mounted within said slot and extending through said opening in said movable plate, said support plate and said movable plate co-acting to form a pivotal connection for said latch pin, and resilient means connecting said support plate and said movable plate for pivotally biasing said latch pin toward a latching position.

23. In a switch having a movable contact carrying member capable of performing a switching function, the combination comprising a control member adapted to move with said contact carrying member to perform said switching function, and latching means carried by said control member so as to be movable therewith, said latching means including a rigid support plate having a slot therein, a latch pin having a first and second reduced section within first and second transverse grooves, a movable plate mounted on said control member having an opening therethrough, said movable plate and said support plate engaging said latch pin within said first and second transverse grooves respectively to form a pivotal connection therefor, and means biasing said movable plate to pivotally bias said latch pin within said slot toward a latching position.

References Cited in the file of this patent
UNITED STATES PATENTS

| | | |
|---|---|---|
| 1,790,243 | Nilson | Jan. 27, 1931 |
| 1,951,028 | Lux | Mar. 13, 1934 |
| 2,172,940 | Magyar | Sept. 12, 1939 |
| 2,458,853 | Hughes | Jan. 11, 1949 |
| 2,585,018 | Kreitchman et al. | Feb. 12, 1952 |
| 2,706,224 | White | Apr. 12, 1955 |